US012145371B2

(12) United States Patent
Shimamura

(10) Patent No.: US 12,145,371 B2
(45) Date of Patent: Nov. 19, 2024

(54) LIQUID STORAGE BOTTLE AND LIQUID REPLENISHING SYSTEM

(71) Applicant: CANON KABUSHIKI KAISHA, Tokyo (JP)

(72) Inventor: Ryo Shimamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 17/952,046

(22) Filed: Sep. 23, 2022

(65) Prior Publication Data

US 2023/0113591 A1 Apr. 13, 2023

(30) Foreign Application Priority Data

Oct. 13, 2021 (JP) ................................. 2021-168119

(51) Int. Cl.
*B41J 2/175* (2006.01)
*B65D 1/02* (2006.01)
*B65D 47/12* (2006.01)

(52) U.S. Cl.
CPC ........ *B41J 2/17506* (2013.01); *B65D 1/0246* (2013.01); *B65D 47/12* (2013.01)

(58) Field of Classification Search
CPC ................ B41J 2/17506; B41J 2/17509; B41J 2/17523; B41J 29/13; B65D 1/0246; B65D 47/12; B65D 47/32; B65D 47/127
See application file for complete search history.

(56) References Cited

U.S. PATENT DOCUMENTS

2011/0209335 A1 9/2011 Yamamoto et al. .... B23P 17/00
2011/0211028 A1 9/2011 Tsukamoto et al. ..... B41J 2/175
2017/0136776 A1 5/2017 Shiba et al. ............ B41J 2/175
2017/0151797 A1 6/2017 Hayashi et al. ......... B41J 2/175
2017/0151803 A1 6/2017 Yoshii et al. ............ B41J 2/175
2017/0305164 A1 10/2017 Orihara et al. .......... B41J 2/175
2017/0305165 A1 10/2017 Ikebe et al. .............. B41J 2/175
2017/0305166 A1 10/2017 Shimamura et al. .... B41J 2/175
2017/0326882 A1 11/2017 Okude et al. ............ B41J 2/175
2017/0361619 A1 12/2017 Arai et al. ............... B41J 2/175
2018/0001650 A1 1/2018 Miyashita et al. ........ B41J 2/175
2018/0272723 A1* 9/2018 Shinada ............... B41J 2/17509
2018/0339520 A1 11/2018 Shiba et al. ............ B41J 2/175
2018/0370243 A1 12/2018 Shimamura et al. .... B41J 29/13
2019/0023019 A1 1/2019 Ikebe et al. .............. B41J 29/13
(Continued)

FOREIGN PATENT DOCUMENTS

JP 2019-177567 10/2019
JP 2020189454 A * 11/2020 .......... B41J 2/17513

*Primary Examiner* — Justin Seo
*Assistant Examiner* — Tracey M McMillion
(74) *Attorney, Agent, or Firm* — Venable LLP

(57) ABSTRACT

Provide is a liquid storage bottle capable of discharging liquid while preventing the liquid stored therein from remaining. The liquid storage bottle has a bottle body and a nozzle for pouring out the liquid stored in the bottle body, and inside the nozzle, a first fluid passage and a second fluid passages each of which opens to an outside on a tip end side of the nozzle and parallel to each other, and a communication passage which opens to an inside of the bottle body on a base end side of the nozzle and communicates with both the first and second fluid passages, are formed, and an inner circumferential surface of the communication passage is inclined inwardly toward the first and second fluid passages.

13 Claims, 10 Drawing Sheets

(56) References Cited

U.S. PATENT DOCUMENTS

| | | | | |
|---|---|---|---|---|
| 2019/0337296 | A1 | 11/2019 | Arai et al. ............... | B41J 2/175 |
| 2019/0344577 | A1 | 11/2019 | Miyashita et al. ....... | B41J 2/175 |
| 2020/0198359 | A1 | 6/2020 | Shimamura et al. .... | B41J 29/13 |
| 2022/0048295 | A1 | 2/2022 | Shimamura et al. .... | B41J 2/175 |
| 2022/0266596 | A1 | 8/2022 | Shimamura ............. | B41J 2/175 |

* cited by examiner

LIQUID STORAGE BOTTLE AND LIQUID REPLENISHING SYSTEM

BACKGROUND OF THE INVENTION

Field of the Invention

The present disclosure relates to a liquid storage bottle and a liquid replenishing system.

Description of the Related Art

Some liquid tanks used in a liquid ejecting apparatus that ejects ink or other liquids can be replenished the liquid from a liquid storage bottle which is prepared separately. Such liquid storage bottles for replenishing the liquid are required to ensure that the replenished liquid does not leak out unexpectedly and contaminate the user's hands and surroundings. Japanese Patent Application Laid-Open No. 2019-177567 describes a liquid storage bottle having a bottle body and a bottle cap rotatably attached to the bottle body. The bottle cap can be rotated into a close state in which an opening of the bottle body is closed to block the pouring of the liquid from the bottle body and an open state in which the opening of the bottle body is opened to allow the pouring of liquid from the bottle body. As a result, in the liquid storage bottle disclosed by Japanese Patent Application Laid-Open No. 2019-177567, the liquid tank is opened only when the liquid is replenished and closed for the others, thereby preventing the liquid from leaking out unexpectedly.

SUMMARY OF THE INVENTION

However, in the case of the liquid storage bottle disclosed by Japanese Patent Application Laid-Open No. 2019-177567, even if all the liquid in the bottle is tried to be poured out, the liquid may remain inside due to the structure thereof. Therefore, when the liquid storage bottle is removed from the liquid tank after replenishing, the liquid remaining inside may drip from the bottle and adhere to the user's hands and surroundings, making them dirty.

Therefore, it is an object of the present disclosure to provide a liquid storage bottle and a liquid replenishing system that can eject the liquid while preventing the liquid of the contents from remaining.

To achieve the above purpose, the liquid storage bottle of the present disclosure is a liquid storage bottle that stores a liquid to be replenished into a liquid tank, comprising: a bottle body; and a nozzle for pouring out the liquid stored in the bottle body, wherein a first fluid passage and a second fluid passage each of which respectively opens to an outside at a tip side of the nozzle and are parallel to each other, and a communication passage which opens to an inside of the bottle body at a base end side of the nozzle and communicates with the first fluid passage and the second fluid passage, are formed in an interior of the nozzle, and an inner circumferential surface of the communication passage is inclined inwardly toward the first fluid passage and the second fluid passage.

In addition, a liquid replenishing system of the present disclosure also has a liquid tank and the above described liquid storage bottle for storing the liquid to be replenished in the liquid tank.

Further features of the present invention will become apparent from the following description of exemplary embodiments with reference to the attached drawings.

DESCRIPTION OF THE EMBODIMENTS

Embodiments of the present disclosure will be described in detail below with reference to the drawings. Although a case where a liquid storage bottle and a liquid replenishing system are used to replenish ink as a liquid into a liquid ejecting apparatus is described as an aspect of a liquid storage bottle and a liquid replenishing system of the present disclosure, an application of the liquid storage bottle and the liquid replenishing system of the present disclosure is not limited to such case.

First Embodiment

Figure 1:
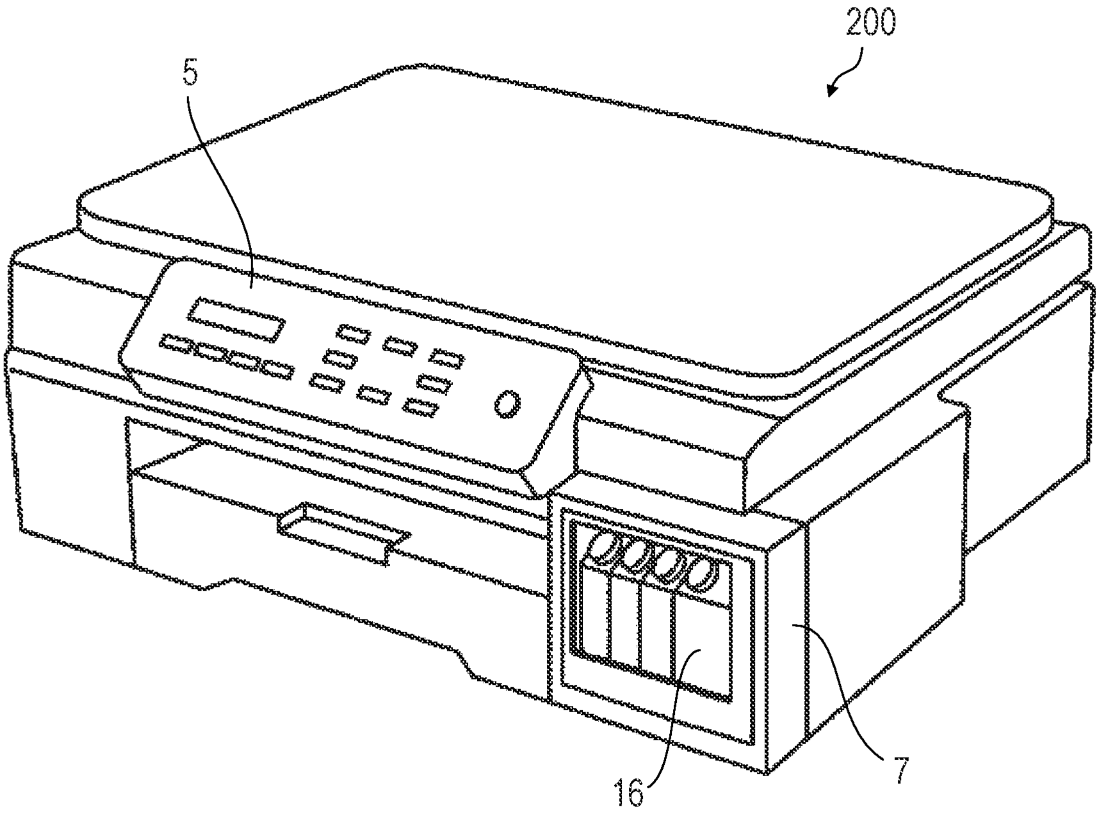
FIG. 1 is a perspective view of a liquid ejecting apparatus according to a first embodiment.
Figure 2:
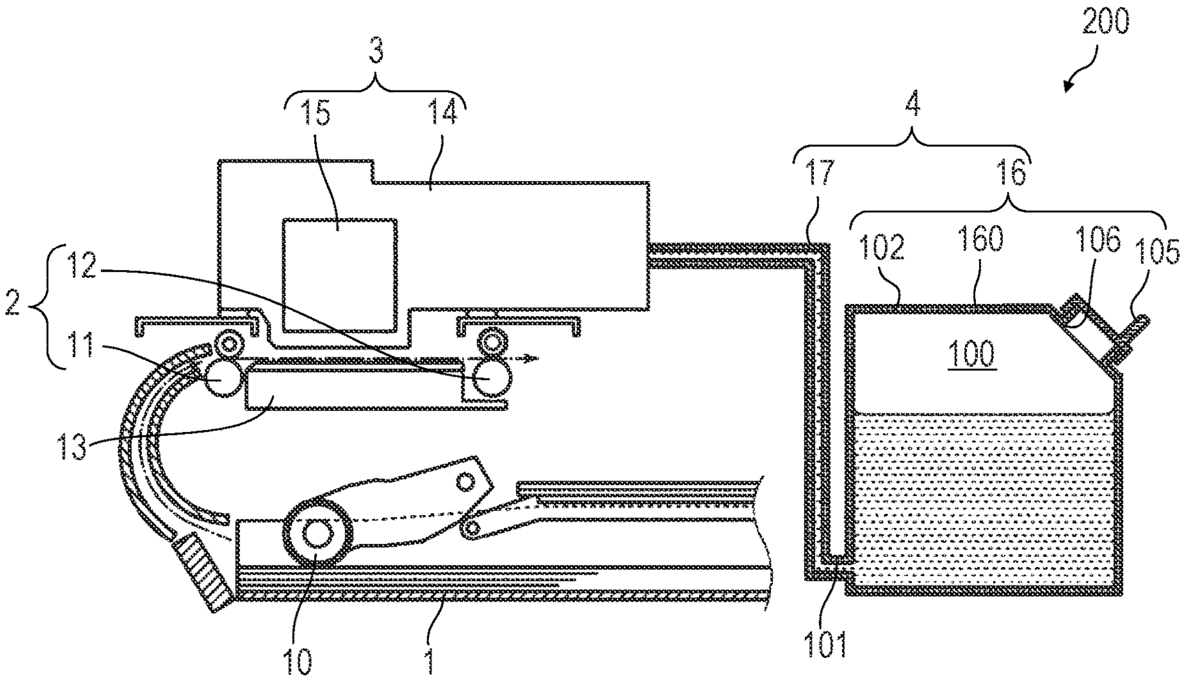
FIG. 2 is a side view schematically showing a main part of the liquid ejecting apparatus according to the first embodiment.

FIG. 1 is a perspective view of a liquid ejecting apparatus according to the first embodiment of the present disclosure. FIG. 2 is a side view schematically showing a main part of the liquid ejecting apparatus of first embodiment.

The liquid ejecting apparatus 200 includes a feeding unit 1, a conveyance unit 2, an ejecting unit 3, a liquid supply unit 4, and a display unit 5.

The feeding unit 1 has a feeding roller 10 that separates one printing medium at a time from a sheet like bundle of printing media stored in a tray and supplies the separated printing media to the conveyance unit 2. The conveyance unit 2 has a conveyance roller 11 and a medium discharge roller 12, both of which conveys the printing medium supplied from a feeding unit 1. Between the conveyance roller 11 and the medium discharge roller 12, a platen 13 is arranged to support the conveyed printing medium from below. The ejecting unit 3 has a carriage 14 positioned above the platen 13 and reciprocating in the direction intersecting a conveyance direction of the printing medium, and a liquid ejecting head 15 mounted on the carriage 14 and ejecting the liquid such as ink. The ejecting unit 3 can print the image on the printing medium supported by the platen 13 by the liquid ejecting head 15 ejecting the liquid based on an image information.

The liquid supply unit 4 has a liquid tank 16 and a flexible supply tube 17 connecting the liquid tank 16 and the liquid ejecting head 15 through a liquid passage 101. The liquid tank 16 has a storage chamber 100 inside for storing the liquid, a tank body 160 formed with an inlet 106 for injecting the liquid into the storage chamber 100, and a tank cap 105 which can be detachably attached to the tank body 160 to close the storage chamber 100. The liquid stored in the storage chamber 100 is supplied from the liquid passage 101 to the liquid ejecting head 15 through the supply tube 17 in accordance with an amount of the liquid ejected from the liquid ejecting head 15. At this time, the same amount of air as that of the liquid supplied to the liquid ejecting head 15 flows into the storage chamber 100 in the liquid tank 16 through an air communication port 102 provided on an upper surface of the tank body 160. In the present embodiment, four colors (for example, cyan, magenta, yellow, and black) of ink are used as the liquid, and the liquid tank 16 and the supply tube 17 are provided for each of the colors of ink. The colors of the liquid used is not limited to four colors, and may be one color or two or more colors. Also, in the present embodiment, the liquid tank 16 is housed inside a liquid ejecting apparatus 200 body, but the position of the liquid tank 16 is not limited to this and may be outside the liquid ejecting apparatus 200 body as long as the liquid can be supplied to the liquid ejecting head 15.

The display unit 5 displays information (operation status, operation items, menus, etc.) necessary for operating the liquid ejecting apparatus 200 and also indicates information that the user is prompted to replenish the liquid to the liquid tank 16.

Figure 3:
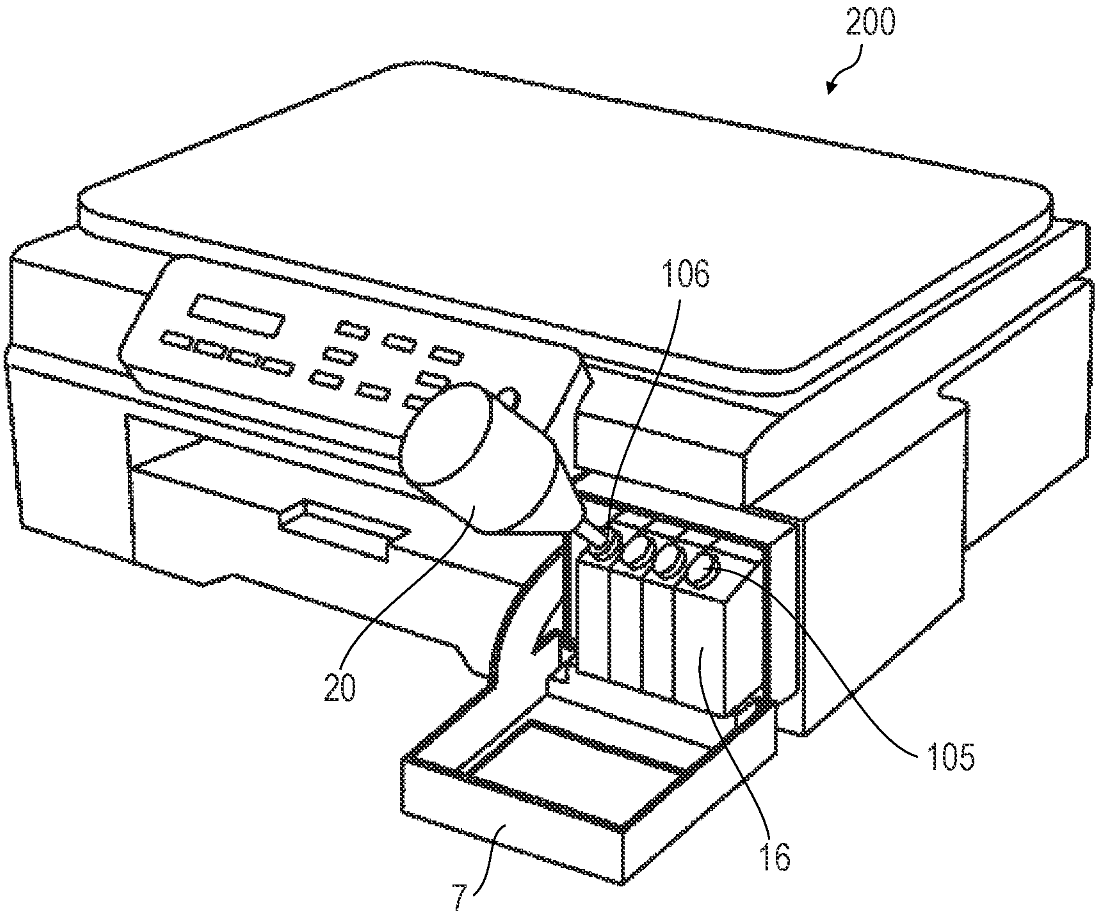
FIG. 3 is a perspective view showing a state of replenishing the liquid into a liquid ejecting apparatus shown in FIG. 1.

FIG. 3 is a perspective view showing the state of replenishing the liquid into to liquid ejecting apparatus shown in FIG. 1.

A user tilts a cover 7 provided on a front surface of the liquid ejecting apparatus 200 forwardly to open it, removes a tank cap 105 attached to the liquid tank 16 to be replenished with the liquid, and exposes the inlet 106. Then, using a liquid storage bottle 20 storing the liquid to be replenished, the liquid is replenished into the liquid tank 16 through the exposed inlet 106.

Figure 4:
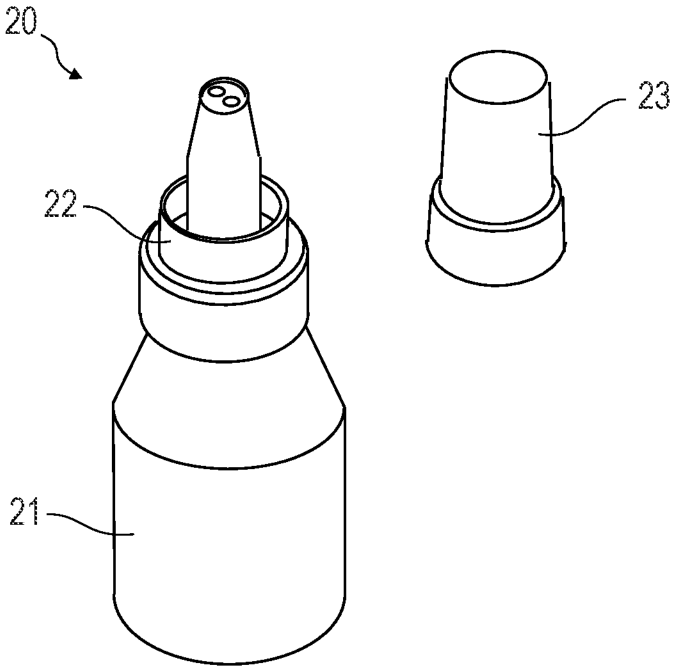
FIG. 4 is a perspective view of a liquid storage bottle according to the first embodiment.
Figure 5A:
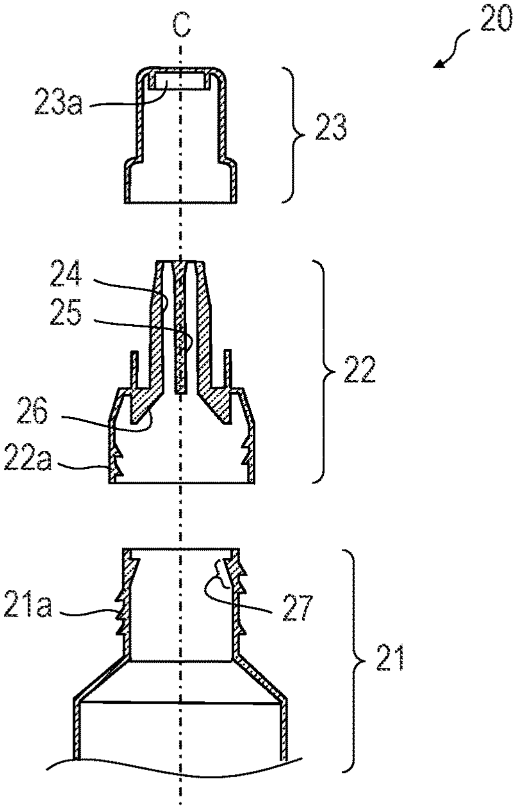
FIG. 5A is an exploded cross-sectional view of the liquid storage bottle according to the first embodiment, FIG. 5B. is a cross-sectional view showing a main part of the liquid storage bottle.
Figure 5B:
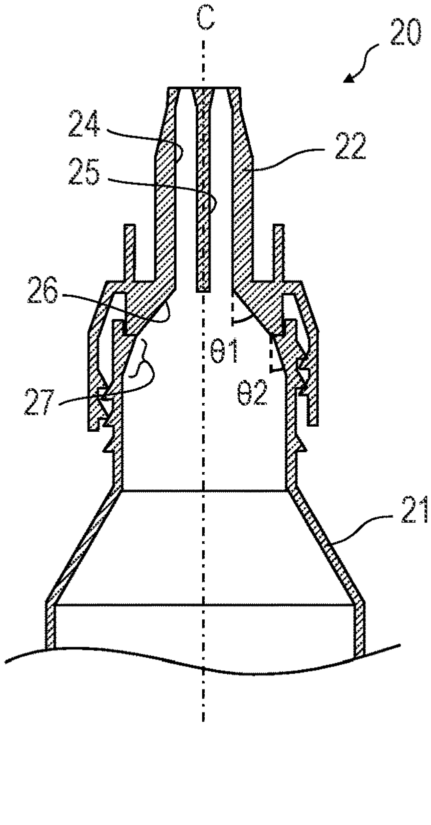
FIG. 5C is a plan view of an inside of a nozzle.
Figure 5C:
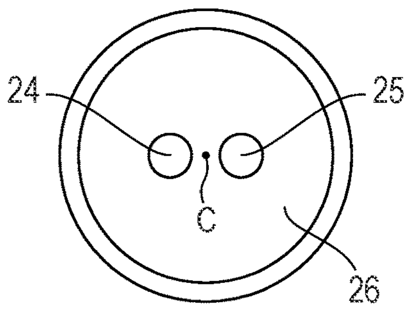

FIG. 4 is a perspective view of the liquid storage bottle of the present embodiment. FIG. 5A is an exploded cross-sectional view of the liquid storage bottle of the present embodiment, and FIG. 5B is a cross-sectional view showing a main part of the liquid storage bottle of the present embodiment, both of which show a cross section including the central axis of the bottle. FIG. 5C is a plan view of the inside of the nozzle constituting the liquid storage bottle of the present embodiment viewed from a base end side.

The liquid storage bottle 20 is a cylindrical container for replenishing the liquid into the liquid tank 16, and together with the liquid tank 16, constitutes the liquid replenishing system of the present embodiment. The liquid storage bottle 20 has a bottle body 21 for storing the liquid, a nozzle 22 for pouring out the liquid stored in the bottle body 21, and a cap 23 that can be detachably attached to the nozzle 22 to close a tip end of the nozzle 22. An upper part of the bottle body 21 is provided with a bottle screw part 21*a* with a male screw formed on an outer circumferential surface, and a lower part of the nozzle 22 is provided with a cylindrical nozzle screw part 22*a* protruding with a female screw formed on the inner circumferential surface. The nozzle 22 is fixed to the bottle body 21 by screwing the female screw of the nozzle screw part 22*a* with the male screw of the bottle screw part 21*a*. The bottom surface of the cap 23 (the surface facing the tip end of the nozzle 22) is provided with an annular rib 23*a* that covers the tip end of the nozzle 22 when the cap 23 is attached to the nozzle 22.

Two fluid passages 24, 25 parallel to each other and a communication passage 26 communicating with them are formed inside the nozzle 22. The two fluid passages 24, 25 open to an outside on a tip end side of the nozzle 22, respectively, and are formed symmetrically with respect to a central axis (hereinafter also referred to simply as 'central axis') C of the liquid storage bottle 20, that is, the nozzle 22 (and the bottle body 21), as shown in FIG. 5C. However, if the two fluid passages 24, 25 are formed at positions opposite to each other across the central axis C, the distance between the two passages 24, 25 in the vertical direction can be separated as much as possible in the optimal liquid replenishing posture described later, which is preferable in that the gas-liquid exchange action is enhanced. Therefore, the formation positions of the fluid passages 24, 25 need not necessarily be symmetrical with respect to the central axis C, as long as they are opposite to each other across the central axis C. FIG. 5A and FIG. 5B show cross sectional views including the central axes of the two fluid passages 24, 25, respectively.

The communication passage 26 has an inner circumferential surface that opens into the bottle body 21 at the base end side of the nozzle 22 and is inclined inwardly toward the two fluid passages 24, 25, and more specifically, has an inner circumferential surface that continuously connects without a step to the inner circumferential surface of the two fluid passages 24, 25, respectively. In other words, the inner circumferential surface of the communication passage 26 is shaped like two oblique cones coalescing into one, and smoothly connects to the inner circumferential surfaces of the two fluid passages 24, 25 at the apex of each oblique cone. Here, "inclination" means that there is a predetermined inclination angle $\theta 1$ ($0 \text{ degrees} < \theta 1 < 180 \text{ degrees}$), with respect to the central axis C, and includes not only the case of linear inclination but also the case of curvilinear inclination in the cross section including the central axis C. In addition, in the following description, when "inclination angle" is used, unless otherwise noted, the inclination angle with respect to the central axis C shall be indicated.

On an upper part of the bottle body 21, an abutting wall 27 that projects annularly from the inner circumferential surface and abuts the nozzle 22 when the nozzle 22 is fixed to the bottle body 21, is formed. The abutting wall 27 is inclined inwardly toward an upward and has an inner circumferential surface of a frustum shape that continuously connects to the inner circumferential surface of the communication passage 26 without a step. The inclination angle $\theta 2$ of the inner circumferential surface can be arbitrarily set to avoid sudden tapering on an area from the inside of the bottle body 21 to the communication passage 26 of the nozzle 22. Also, the inner circumferential surface of the abutting wall 27, like the inner circumferential surface of the communication passage 26, is not limited to a form that is linearly inclined in the cross section including the central axis C, but may be inclined with a curvature.

Figure 6:
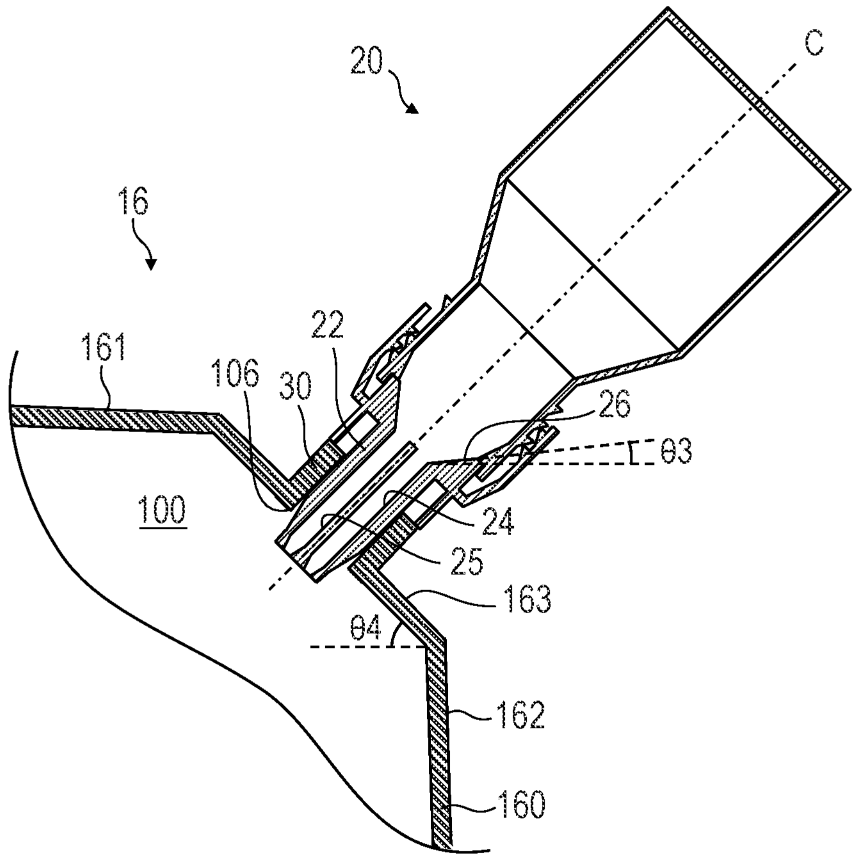
FIG. 6 is a cross-sectional view showing the liquid replenishing operation according to the first embodiment.

FIG. 6 is a cross-sectional view showing the liquid replenishing operation by using a liquid replenishing system of the present embodiment.

The tank body 160 of the liquid tank 16 is formed in a roughly rectangular solid shape, and an adapter 30 into which the nozzle 22 of the liquid storage bottle 20 can be inserted is formed on an inclined surface 163 formed between an upper surface 161 and a side surface 162. The adapter 30 protrudes cylindrically from the periphery of the inlet 106 for pouring out the liquid into the storage chamber 100, and has an inner circumferential surface that can be fitted into the outer circumferential surface of the nozzle 22 of the liquid storage bottle 20.

In the liquid replenishing operation, the user holds the liquid storage bottle 20, and by inserting and fitting the nozzle 22 of the liquid storage bottle 20 into the adapter 30 of the liquid tank 16, the liquid storage bottle 20 is held in the liquid tank 16. At this time, the liquid (not shown) in the liquid storage bottle 20 flows downwardly toward the nozzle 22, passes through one of the two fluid passages 24, 25, and is poured into the storage chamber 100 in the liquid tank 16. At the same time, air (gas) in a storage chamber 100 is pumped into the liquid storage bottle 20 through the other of the two fluid passages 24, 25. The liquid in the liquid storage bottle 20 is replenished into the liquid tank 16 by such gas-liquid exchange action. After the replenishing of the liquid is completed, the replenishing operation of the liquid is completed when the user removes the liquid storage bottle 20.

In the present embodiment, as described above, the inner circumferential surface of the communication passage 26 in the nozzle 22 is inclined inwardly toward the two fluid passages 24, 25. Therefore, when the liquid storage bottle 20 is tilted, there is hardly any recess formed inside the nozzle 22 which can be a liquid storage part. In addition, as shown in FIG. 6, when the nozzle 22 and the adapter 30 are engaged with each other and the liquid storage bottle 20 is held by the liquid tank 16, an area located on the lowest of the inner circumferential surfaces of the communication passage 26 is inclined downwardly toward the two fluid passages 24, 25. Therefore, even in the liquid replenishing operation described above, almost no recess which can be a liquid storage part is formed inside the nozzle 22. Therefore, when liquid is replenished from the liquid storage bottle 20 to the liquid tank 16, the liquid in the liquid storage bottle 20 can be ejected with almost no residue. As a result, when the liquid storage bottle 20 is removed from the liquid tank 16 after the liquid replenishing operation is completed, dripping of the liquid from the liquid storage bottle 20 and adhering to the user's hand and surroundings can be suppressed.

When the liquid storage bottle 20 is tilted, it is preferable that no recess is formed between the nozzle 22 and the bottle body 21 as well as the inside of the nozzle 22, which can be the storage part for the liquid. For this reason, it is preferable that the inner circumferential surface of the nozzle 22 and the inner circumferential surface of the bottle body 21 are continuous without any step as described above, and in other words, it is preferable that the opening diameter of the base end side of the nozzle 22 and the opening diameter of the bottle body 21 are substantially the same. In addition, the inner circumferential surface of the bottle body 21 is preferably composed of a cylindrical inner circumferential surface and the frustum shaped inner circumferential surface, which are continuously connected to each other without steps as shown in the figure. As a result, when the liquid storage bottle 20 is tilted, the formation of the recess in the bottle body 21, which can be the liquid storage part, can also be suppressed.

Such configuration makes it easier for the liquid in the liquid storage bottle 20 to flow toward the two fluid passages 24, 25, thereby enhancing the replenishment efficiency of the liquid in the liquid tank 16. From this point of view, the adapter 30 may not necessarily be provided on the inclined surface 163 of the tank body 160, for example, it may be provided on the surface parallel to the horizontal plane of the tank body 160, i.e., the upper surface 161.

In the liquid replenishing operation described above, which of the two fluid passages 24, 25 the liquid in the liquid storage bottle 20 flows is determined by the effect of gravity. That is, the liquid in the liquid storage bottle 20 flows easily through the fluid passage, among the two fluid passages 24, 25, where the opening on the side of the communication passage 26 is located more downward when the liquid storage bottle 20 is held by the liquid tank 16. However, in the present embodiment, both the outer circumferential surface of the nozzle 22 and the inner circumferential surface of the adapter 30 are cylindrical, and therefore, the nozzle 22 is rotatable with respect to the adapter 30 even when both are engaged. Therefore, for example, when the nozzle 22 is positioned so that the two fluid passages 24, 25 face each other in the horizontal direction, the gas-liquid exchange efficiency between the liquid tank 16 and the liquid storage bottle 20 may decrease, which may hinder the smooth fluid replenishment.

Therefore, it is preferable that the nozzle 22 is inserted into the adapter 30 and then rotated with respect to the adapter 30 to position the nozzle 22 in the optimal liquid replenishing posture where the two fluid passages 24, 25 are positioned opposite vertically to each other across the central axis C. Such position ensures more reliable gas-liquid exchange between the liquid tank 16 and the liquid storage bottle 20, thereby realizing smooth liquid replenishment. To facilitate such positioning, a user-visible positioning mark may be provided on each of the outer circumferential surface of the nozzle 22 and the inner circumferential surface of the adapter 30. Although FIG. 6 shows that the first fluid passage 24 is positioned so as to be below the second fluid passage 25, it may be the reverse, that is, the second fluid passage 25 may be positioned so as to be below the first fluid passage 24.

Figure 7A:
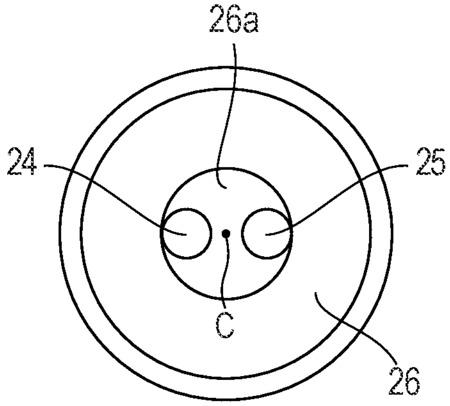
FIGS. 7A, 7B and 7C are plan views respectively showing variations of the communication passage according to the first embodiment.
Figure 7B:
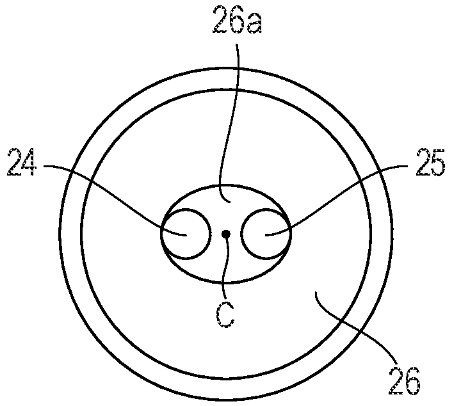
Figure 7C:
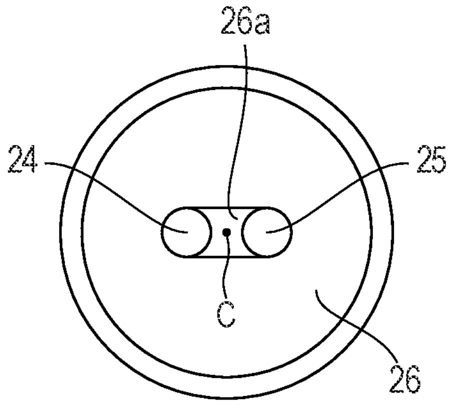

FIGS. 7A to 7C are plan views of the inside of the nozzle as seen from the base end side, each of which shows a variation of the communication passage according to the present embodiment, and the figures correspond to FIG. 5C.

In the above embodiment, the inner circumferential surface of the communication passage 26 is connected to the inner circumferential surfaces of the two fluid passages 24, 25 without a step, respectively, but the shape of the inner circumferential surface of the communication passage 26 is not limited to this as long as it is inclined inwardly toward the two fluid passages 24, 25. For example, as shown in FIG. 7A, the inner circumferential surface of the communication passage 26 may be frustum-shaped with a smaller inner diameter toward the two fluid passages 24, 25. In addition, the inner circumferential surface of the communication passage 26 may be frustum-shaped in which the upper bottom surface and the lower bottom surface do not having a similar shape, as shown in FIG. 7B, the upper bottom surface 26*a* may be an oval and the lower bottom surface may be circular, or as shown in FIG. 7C, the upper bottom surface 26*a* may be an elliptical circular and the lower bottom surface may be circular.

However, in the modified example shown in FIGS. 7A to 7C, the inner circumferential surface of the communication passage 26 is connected to the inner circumferential surfaces of the two fluid passages 24, 25 through a step (step surface) 26*a*, respectively. Therefore, if, for example, the two fluid passages 24, 25 are positioned so as to face each other in the horizontal direction, a slight recess, which can be the storage part of the liquid, is formed between the two fluid passages 24, 25 and the communication passage 26. Therefore, it is preferable that the inner circumferential surface of the communication passage 26 has such a shape that two oblique cones coalesce into one as described above, in that almost no recess is formed in the inside of the nozzle 22 which can be the storage part of the liquid, regardless of the posture of the liquid storage bottle 20.

Second Embodiment

Figure 8A:
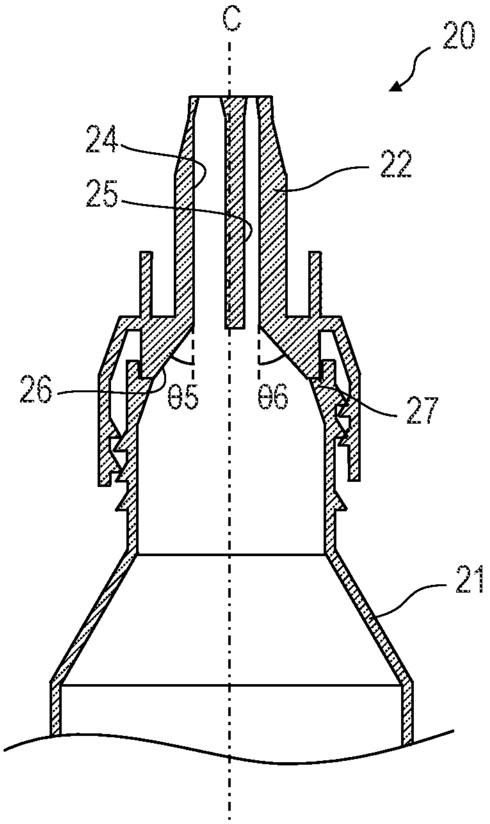
FIG. 8A is a cross-sectional view of a liquid storage bottle according to a second embodiment.
Figure 8B:
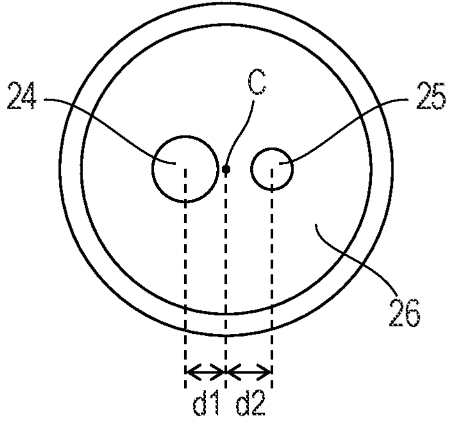
FIG. 8B is a plane view of an inside of a nozzle.
Figure 9:
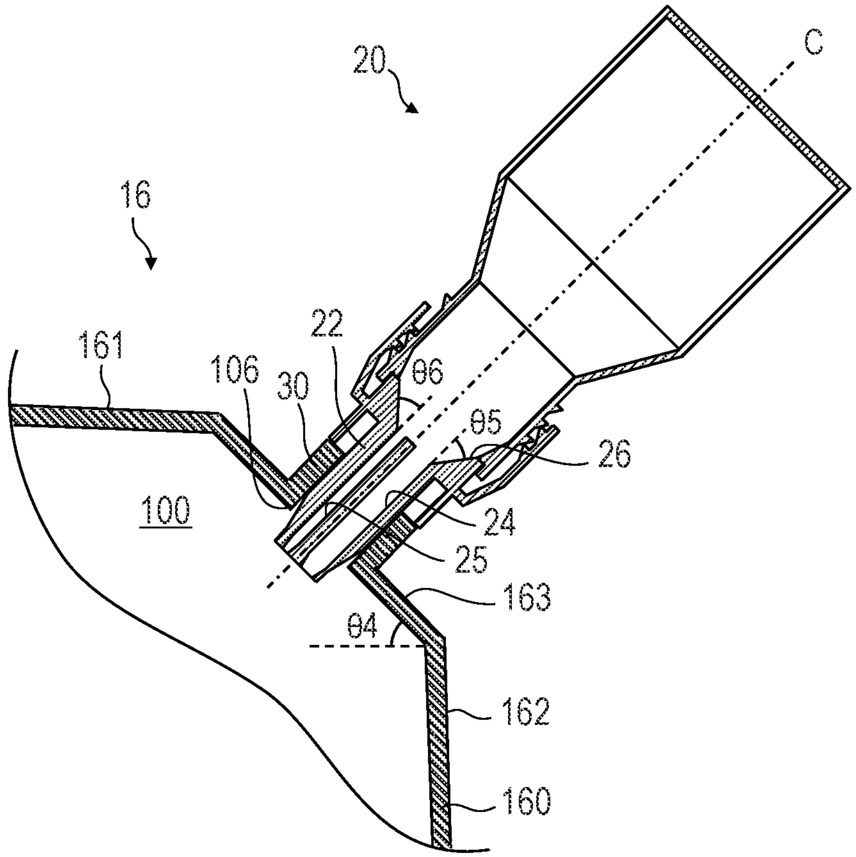
FIG. 9 is a cross-sectional view showing the liquid replenishing operation according to the second embodiment.

FIG. 8A is a cross-sectional view showing the main part of a liquid storage bottle according to a second embodiment of the present disclosure, and FIG. 8B is a plan view of the inside of the nozzle according to the present embodiment as seen from the base end side, corresponding to FIG. 5B and FIG. 5C, respectively. FIG. 9 is a cross-sectional view showing a liquid replenishing operation by a liquid replenishing system of the present embodiment. In the following, the same configuration as that of the first embodiment will be designated with the same symbols and the explanation thereof will be omitted, and a configuration different from that of the first embodiment will be described in detail.

The liquid storage bottle 20 of the present embodiment differs from the first embodiment in the configuration of the two fluid passages 24, 25. Specifically, in the first embodiment, the passage cross-sectional areas of the two fluid passages 24, 25 are the same, but in the present embodiment, the passage cross-sectional area of the first fluid passage 24 is larger than that of the second fluid passage 25. Although in the first embodiment, the distances from the center axis C of the nozzle 22 to each of the center axis of the two fluid passages 24, 25 are the same, in the present embodiment, the distance d2 between the center axis C and the center axis of the second fluid passage 25 is larger than the distance d1 between the center axis C and the center axis of the first fluid passage 24.

Accordingly, in the present embodiment, the first fluid passage 24 having a large passage cross-sectional area is selected as the fluid passage through which the liquid in the liquid storage bottle 20 flows when replenishing the liquid. That is, the nozzle 22 is fitted to the adapter 30 only at a specific circumferential position so that the two fluid passages 24, 25 are vertically opposed to each other and the first fluid passage 24 is located below the second fluid passage 25. As a method for regulating the circumferential position of the nozzle 22, for example, an engagement part (e.g., protrusion) of the nozzle is formed on the outer circumferential surface of the nozzle 22, and an engagement part (e.g., recess) engageable with the engagement part of the nozzle is formed on the inner circumferential surface of the adapter 30.

Thus, in the liquid replenishing operation of the present embodiment, in addition to making it easier to discharge the liquid in the liquid storage bottle 20 through the first fluid passage 24 having a large passage cross-sectional area, it becomes easier to take air into the liquid storage bottle 20 through the second fluid passage 25 located higher. As a result, the gas-liquid exchange between the liquid tank 16 and the liquid storage bottle 20 is more enhanced, and the liquid can be more efficiently replenished into the liquid tank 16. Also, in the present embodiment, since the nozzle 22 is fitted to the adapter 30 only in the optimal liquid replenishing posture, there is no need to rotate the nozzle 22 after inserting it into the adapter 30 to adjust the circumferential position of the nozzle 22 with respect to the adapter 30. Therefore, the user can perform the liquid replenishing operation without touching the liquid storage bottle 20, thereby reducing the risk of the user's hands and surroundings becoming dirty with the liquid.

In the cross-sectional view shown in FIG. 8A, the inner circumferential surface of the communication passage 26 has an inclination angle θ5 in a region continuous to the inner circumferential surface of the first fluid passage 24, which may be the same angle as an inclination angle θ6 in a region continuous to the inner circumferential surface of the second fluid passage 25. However, by making the former smaller than the latter, it is possible to facilitate the flow of the liquid in the liquid storage bottle 20 from the communication passage 26 toward the first fluid passage 24 in the optimal liquid replenishing attitude described above, thereby enhancing the replenishment efficiency of the liquid in the liquid tank 16. In this regard, it is preferable that the inner circumferential surface of the communication passage 26 has the inclination angle θ5 in the region continuous to the inner circumferential surface of the first fluid passage 24 smaller than the inclination angle θ6 in the region continuous to the inner circumferential surface of the second fluid passage 25. In other words, in the cross section including the central axes of each of the two fluid passages 24, 25, the angle formed by the inner circumferential surface of the communication passage 26 and the inner circumferential surface of the first fluid passage 24 is preferably smaller than the angle formed by the inner circumferential surface of the communication passage 26 and the inner circumferential surface of the first fluid passage 24.

Figure 10A:
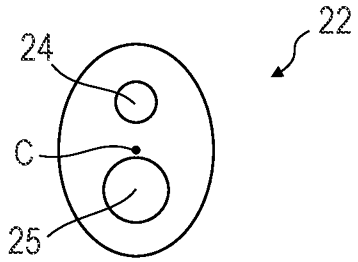
FIGS. 10A and 10B are plan views respectively showing variations of a nozzle according to the second embodiment.
Figure 10B:
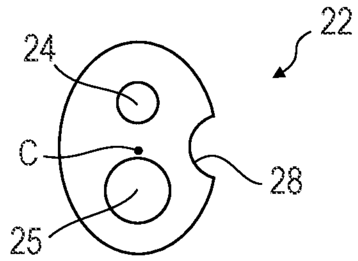

FIG. 10A and FIG. 10B are plan views showing a modified example of the nozzle of the present embodiment, respectively, and the nozzle is viewed from the tip end side.

In order to regulate the circumferential position of the nozzle 22 with respect to the adapter 30, the outer circumferential surface of the nozzle 22 may be elliptically cylindrical, and correspondingly the inner circumferential surface of the adapter 30 may also be elliptically cylindrical, as shown in FIG. 10A. In this case, the two fluid passages 24, 25 are formed in the nozzle 22 so that the plane including the center axis of each of the fluid passages is parallel to the major axis direction of the ellipse, and the adapter 30 is provided in the inclined surface 163 so that the plane including the center axis of each of the fluid passages and the major axis of the ellipse is parallel to the vertical direction.

However, in such a configuration, it is also possible to fit the nozzle 22 into the adapter 30 with the first fluid passage 24 upside-down with respect to the optimal fluid replenishment posture located below the second fluid passage 25. Therefore, as shown in FIG. 10B, it is preferable that an engagement part 28 consisting of a recess is formed on the inner circumferential surface of the nozzle 22, and accordingly, an engagement part consisting of a protrusion portion engageable with the engagement part 28 is formed on the outer circumferential surface of the adapter 30. Thus, the nozzle 22 can be fitted to the adapter 30 in a proper vertical position. Alternatively, a positioning mark may be provided on each of the outer circumferential surface of the nozzle 22 and the inner circumferential surface of the adapter 30 to enable the user to visually identify the optimal liquid replenishment posture.

According to the present disclosure, the liquid can be poured out while the liquid of the contents is restrained from remaining.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-168119, filed Oct. 13, 2021, which is hereby incorporated by reference herein in its entirety.

What is claimed is:

1. A liquid storage bottle that stores a liquid to be replenished into a liquid tank, comprising:

a bottle body; and a nozzle for pouring out the liquid stored in the bottle body, wherein a first fluid passage and a second fluid passage each of which respectively opens to an outside at a tip side of the nozzle and are parallel to each other, and a communication passage which opens to an inside of the bottle body at a base end side of the nozzle and communicates with the first fluid passage and the second fluid passage, are formed in an interior of the nozzle, wherein an inner circumferential surface of the communication passage is inclined inwardly toward the first fluid passage and the second fluid passage, and wherein the inner circumferential surface of the communication passage is continuously connected to an inner circumferential surface of the first fluid passage without a step and is connected to an inner circumferential surface of the second fluid passage without a step.

2. The liquid storage bottle according to claim 1, wherein the first fluid passage and the second fluid passage are formed in positions opposite each other across a central axis of the nozzle.

3. The liquid storage bottle according to claim 2, wherein a passage cross sectional area of the first fluid passage is greater than that of the second fluid passage.

4. The liquid storage bottle according to claim 3, wherein in the cross section including a central axis the first fluid passage and a central axis of the second fluid passage, an angle formed by the inner circumferential surface of the communication passage and the inner circumferential surface of the first fluid passage is smaller than an angle formed by the inner circumferential surface of the communication passage and the inner circumferential surface of the second fluid passage.

5. The liquid storage bottle according to claim 2, wherein a distance from a central axis of the nozzle to a central axis of the second fluid passage is greater than a distance from the central axis of the nozzle to a central axis of the first fluid passage.

6. The liquid storage bottle according to claim 1, wherein the bottle body has an inner circumferential surface continuously connected to the inner circumferential surface of the communication passage, without a step.

7. The liquid storage bottle according to claim 6, wherein the inner circumferential surface of the bottle body includes a cylindrical inner circumferential surface and a frustum shaped inner circumferential surface continuously connected to the cylindrical inner circumferential surface without a step.

8. The liquid storage bottle that stores a liquid to be replenished into a liquid tank, comprising:

a bottle body; and a nozzle for pouring out the liquid stored in the bottle body, wherein a first fluid passage and a second fluid passage each of which respectively opens to an outside at a tip side of the nozzle and are parallel to each other, and a communication passage which opens to an inside of the bottle body at a base end side of the nozzle and communicates with the first fluid passage and the second fluid passage, are formed in an interior of the nozzle, wherein an inner circumferential surface of the communication passage is inclined inwardly toward the first fluid passage and the second fluid passage, and wherein the inner circumferential surface of the communication passage forms a frustum shape and is connected to an inner circumferential surface of the first fluid passage through a step and is connected to an inner circumferential surface of the second fluid passage through a step.

9. A liquid replenishing system comprising:

a liquid tank; and a liquid storage bottle which stores a liquid to be replenished into the liquid tank, the liquid storage bottle comprising:

a bottle body; and a nozzle for pouring out the liquid stored in the bottle body, wherein a first fluid passage and a second fluid passage each of which respectively opens to an outside at a tip side of the nozzle and are parallel to each other, and a communication passage which opens to an inside of the bottle body at a base end side of the nozzle and communicates with the first fluid passage and the second fluid passage, are formed in an interior of the nozzle, wherein an inner circumferential surface of the communication passage is inclined inwardly toward the first fluid passage and the second fluid passage, wherein the liquid tank has a tank body, and an adapter which is provided on an inclined surface connecting an upper surface of the tank body with a side surface of the tank body, protrudes in a cylindrical shape from a peripheral part of an inlet for injecting the liquid, and has an inner circumference surface that can be fitted to an outer circumference surface of the nozzle, wherein when the nozzle and the adapter are engaged with each other, a region located lowest of the inner circumferential surfaces of the communication passage is inclined downwardly toward the first fluid passage and the second fluid passage, and wherein an inclination angle of the inner circumferential surface of the communication passage with respect to a horizontal plane of the region is greater than an inclination angle of the inclined surface with respect to the horizontal plane.

10. The liquid replenishing system according to claim 9, wherein the inner circumferential surface of the adapter has an elliptical cylindrical shape and the outer circumferential surface of the nozzle has an elliptical cylindrical shape, and the adapter is provided on the inclined surface so that a plane including a central axis of the adapter and a major axis of an ellipse of the elliptical cylindrical shape is parallel to a vertical direction, and the first fluid passage and the second fluid passage are formed on the nozzle so that a plane including a central axis of each of the first fluid passage and the second fluid passage is parallel to a major axis direction of the ellipse.

11. The liquid replenishing system according to claim 9, wherein a first engagement part is formed on the outer circumferential surface of the nozzle, and a second engagement part engageable with the first engagement part is formed on the inner circumferential surface of the adapter.

12. The liquid replenishing system according to claim 9, wherein the outer circumferential surface of the nozzle and the inner circumferential surface of the adapter are each provided with positioning marks for positioning the nozzle with respect to the adapter.

13. The liquid replenishing system according to claim 9, wherein the liquid tank is housed inside a liquid ejecting apparatus.

* * * * *